(12) United States Patent
Haas et al.

(10) Patent No.: US 7,858,674 B2
(45) Date of Patent: Dec. 28, 2010

(54) ANTIMICROBIAL RUBBER FORMULATIONS AND MOLDED ARTICLE

(75) Inventors: Geoffrey R Haas, Spartanburg, SC (US); Robert C Kerr, Moore, SC (US); Carolina Mateus, Spartanburg, SC (US); David L Morris, Salford (GB); Bhawan Patel, Bolton (GB); Jenci Kurja, Knokke-Heist (BE)

(73) Assignee: Milliken & Co., Spartanburg, SC (US)

( * ) Notice: Subject to any disclaimer, the term of this patent is extended or adjusted under 35 U.S.C. 154(b) by 667 days.

(21) Appl. No.: 11/702,396

(22) Filed: Feb. 5, 2007
(Under 37 CFR 1.47)

(65) Prior Publication Data

US 2008/0187560 A1    Aug. 7, 2008

(51) Int. Cl.
*C08K 5/04*    (2006.01)
*C08K 5/09*    (2006.01)
*C08K 3/10*    (2006.01)
*C08K 3/20*    (2006.01)
*C08K 3/36*    (2006.01)

(52) U.S. Cl. .................. 523/122; 524/86; 524/297; 524/398; 524/403; 524/450; 524/494

(58) Field of Classification Search .......... 523/122; 524/86, 297, 398, 403, 450, 494
See application file for complete search history.

(56) References Cited

U.S. PATENT DOCUMENTS

| 6,448,306 | B1 * | 9/2002 | Lever et al. ................ 523/122 |
| 6,455,610 | B1 * | 9/2002 | Lever et al. ................ 523/122 |
| 6,555,599 | B2 * | 4/2003 | Lever et al. ................ 523/122 |
| 6,593,260 | B2 | 7/2003 | Nomura ...................... 501/48 |
| 6,831,028 | B1 | 12/2004 | Ishii et al. ................... 501/33 |
| 6,846,871 | B2 * | 1/2005 | Patel et al. ................. 524/440 |
| 6,852,782 | B2 | 2/2005 | Patel et al. ................. 524/287 |
| 6,939,820 | B2 | 9/2005 | Numaguchi et al. .......... 501/45 |
| 6,943,205 | B2 * | 9/2005 | Patel et al. ................. 523/122 |
| 7,060,739 | B2 | 6/2006 | Patel et al. ................. 523/122 |
| 2003/0008937 | A1 * | 1/2003 | Lever et al. ................ 523/122 |
| 2004/0214915 | A1 * | 10/2004 | Patel et al. ................. 523/122 |
| 2004/0214939 | A1 * | 10/2004 | Patel et al. ................. 524/440 |

* cited by examiner

*Primary Examiner*—Kriellion A Sanders
(74) *Attorney, Agent, or Firm*—Brenda D. Wentz

(57) ABSTRACT

This disclosure relates generally to molded rubber articles such as the type used in water contact applications. More particularly, this disclosure is directed to molded rubber articles containing antimicrobial agents that control biofilm growth on the surface of the molded article. The molded rubber article is comprised of curable rubber compounds and a combination of both inorganic silver-containing antimicrobial agents and organic antimicrobial agents. An exemplary molded rubber article comprises ethylene propylene diene monomer rubber, silver-containing ion exchange antimicrobial agent, and an organic antifungal agent such as zinc pyrithione.

18 Claims, No Drawings

ANTIMICROBIAL RUBBER FORMULATIONS AND MOLDED ARTICLE

TECHNICAL FIELD

This disclosure relates generally to molded rubber articles such as the type used in water contact applications. More particularly, this disclosure is directed to molded rubber articles containing antimicrobial agents that control microbial growth on the surface of the molded article. The molded rubber article is comprised of curable rubber compounds and a combination of both inorganic silver-containing antimicrobial agents and organic antimicrobial agents. An exemplary molded rubber article comprises ethylene propylene diene monomer rubber, silver-containing ion exchange antimicrobial agent, and an organic antifungal agent such as zinc pyrithione.

BACKGROUND

Antimicrobial agents have been incorporated into many different substrates for preventing and controlling the growth of microbes. However, with the continual introduction of new consumer products, there exists a constant demand in the marketplace for protection against bacterial and fungal growth presented by some of these new products. For instance, the dispensing mechanism in refrigerators that dispense water and ice present an ideal environment in the dispensing mechanism for the growth of microbes due to the moist environment. Because of its shape and location, it is often difficult for consumers to access the interior portion of the dispensing mechanism so that a thorough cleaning can be conducted. As another example, front loading laundry machines provide an ideal environment for microbial growth in any of the water-contact locations in the machine. One such location includes the circular door sealing gasket used to make a seal between the wash compartment and the glass door. This door sealing gasket is also known as a "bellow."

The growth and proliferation of microbes in a laundry machine generally occurs from exposure to prolonged warm, moist environments which may contain soap residue and clothing residue, such as body oils, fiber particles, and dirt and bacteria from the clothing. This environment leads to the development of undesirable odors and biofilm. Biofilm is the growth of microbes, such as bacteria and fungi, on a surface commonly surrounded by an exopolymeric matrix. Both the abundant microbial growth and matrix production result in visible microbial communities, thus damaging the aesthetic appeal of the surface. Additionally, secondary metabolites produced as a result of microbial growth include volatile organic compounds (VOCS) that can be detected by the consumer as foul odors.

Using the example of front loading washing machines, biofilms may form on the washing machine bellow, piping, and tubing, and on the inner surface of the outer wash tub and on the outer surface of the inner wash tub. As the microbes in the biofilm grow, they tend to penetrate the supporting surface resulting in staining of the surface to which the microbes attach. Microbial growth further leads to degradation of the rubber which potentially results in reduced life cycle of the rubber parts or the entire laundry machine. Additionally, in the process of biofilm growth and maturation, portions of the biofilm may detach and come into contact with clothing, towels, sheets, etc. that are laundered in the washing machine. This biofilm-to-clothing contact may undesirably and irreversibly stain and leave a residual odor on the clothing that comes into contact with the detached biofilm during the laundering process.

Historically, washing machine bellows have been formed from sulfur-cured, ethylene propylene diene monomer (EPDM) rubber formulations which do not contain antimicrobial agents. U.S. Pat. No. 6,846,871 to Patel et al. discloses the difficulties associated with adding silver-containing antimicrobial agents to sulfur cured rubber formulations. It is believed, without intending to be bound to any specific scientific theory, that sulfur reacts with silver-based antimicrobial agents and irreversibly binds the silver ions (as silver sulfides, for example) within the rubber composition and/or article itself. As such, the resultant silver sulfides, etc., are ineffective as antimicrobial agents and their presence renders the final product antimicrobially inactive.

Furthermore, it is believed that the addition of only organic antimicrobial agents to the rubber will not result in a molded article that provides long-term antimicrobial efficacy. Often times the organic antimicrobial agents are not able to withstand the high processing temperatures experienced by the rubber article during the vulcanization and molding process. High processing temperatures may cause the organic agent to volatize out of the rubber or decompose. Additionally, the organic agent may leach out during the life of the article, thus providing only limited antimicrobial protection. It is also thought that the incorporation of only inorganic silver-containing antimicrobial agents, for example, will not provide the desired efficacy against fungi without the addition of antifungal agents, the majority of which are organic-based. And, as mentioned previously, traditional molded articles of this type have been sulfur cured primarily because sulfur cured articles are more cost efficient and easier to process than other types of curing systems. However, sulfur-cured molded articles do not provide the requisite features of durable antimicrobial efficacy which results in a molded article having little to no problem associated with undesirable odor generation.

The present disclosure addresses and overcomes the problems described above. As one potentially preferred embodiment of the present invention, the antimicrobial rubber formulation comprises an inorganic, silver-containing ion exchange compound and an organic zinc based compound in a non-sulfur cured rubber. This rubber formulation may be molded into various parts for use in water contact applications, such as washing machine bellows. For these reasons and others that will be described herein, the present antimicrobial rubber formulations represent a useful advance over the prior art.

DETAILED DESCRIPTION

The rubber formulations of the present invention prevent, reduce and potentially eliminate biofilm formation by providing durable antimicrobial properties to rubber parts manufactured therefrom. By combining an inorganic, silver-containing antimicrobial agent with an organic antimicrobial agent and a non-sulfur curing system, the ideal formulation for preventing and controlling the growth of microbes in moist environments may be achieved. It is believed that a synergistic effect is obtained through the utilization of inorganic metals such as silver, which tend to exhibit slow controlled release of the antibacterial agent, and organic compounds such as zinc pyrithione, which tend to exhibit faster release of active antimicrobial compounds.

The compounding of ingredients within each formulation can be carried out in an open mill, an internal mixer, or an extruder where intensive mixing within the polymer matrix of each component will take place. During the mixing operation, the control of temperature rise, due to high shear incorporation of the ingredients, is crucial to ensure that pre-vulcanization (scorch) does not take place during processing. Generally, a maximum temperature of 120° C. is reached on single stage (pass) mixing through an internal mixer. The compounds may be further processed after mixing into specific forms to allow adequate presentation for manufacturing into final molded articles. These processes may include calendering, extrusion, granulation/pelletization, strip form, fabrication and pre-forming into specific shaped blanks.

It is also contemplated that some of the ingredients needed for forming the molded rubber article may be provided in the form of a masterbatch. For example, the silver-containing antimicrobial agents and the organic antimicrobial/antifungal agents may be provided in a concentrated powder which may be added to the rubber during the manufacturing process.

The curing, or vulcanization, of the rubber formulations may occur during the molding process (e.g., compression molding, transfer molding, injection molding), by continuous extrusion (e.g., LCM, UHF [where permissible], autoclave and hot air), and/or by a coating process (e.g., dip coating, spray coating, and the like). The vulcanization (or cure) temperatures can range from 150° C. to 250° C.

Rubber Types

The term "rubber" is intended to cover any standard rubber which must be vulcanized to provide a dimensionally stable rubber article. The term "dimensionally stable" is intended to encompass a vulcanized rubber article that is structurally able to be handled without disintegrating into smaller portions. Thus, the article must exhibit some degree of structural integrity and, being a rubber, a certain degree of flexural modulus. The specific types of rubber are listed below and have been utilized previously within the rubber industry for a variety of applications and are generally well known and taught throughout the prior art.

The rubber component or components of the inventive rubber formulation and cured article is preferably selected from the group consisting of nitrile rubber [such as acrylonitrile-butadiene rubber (NBR)], ethylene propylene diene monomer (EPDM) rubber, hydrogenated NBR, carboxylated NBR, and mixtures thereof.

It is important to consider the desired physical properties of the rubber article when selecting the polymer and the curing system. For example, high molecular weight EPDM polymers tend to exhibit higher green strength and tensile strength and lower compression set compared to lower molecular weight polymers. In peroxide cured elastomers, it is often more desirable to use these high molecular weight polymers as peroxide composites exhibit poorer 'hot tear' strength at elevated temperatures compared to sulfur cured composites.

Antimicrobial Agents

A combination of inorganic silver-containing antimicrobial agents and organic antimicrobial and/or antifungal agents is desired for the molded rubber articles of the present invention. The inorganic silver-containing antimicrobial agent comprises at least one silver ion-releasing compound selected from the group consisting of silver ion exchange materials (e.g. silver zirconium phosphates, silver calcium phosphates and silver zeolites), silver particles (e.g. silver metal, nanosilver, colloidal silver), silver salts (e.g. AgCl, $Ag_2CO_3$), silver glasses (e.g. silver magnesium aluminum phosphates), and mixtures thereof.

One preferred silver-containing compound is an antimicrobial silver sodium hydrogen zirconium phosphate available from Milliken & Company of Spartanburg, S.C., sold under the tradename AlphaSan® silver antimicrobial. Other potentially preferred silver-containing antimicrobials suitable for use include silver zeolites, such as a silver ion-loaded zeolite available from Sinanen Co., Ltd. of Tokyo, Japan under the tradename Zeomic®. Examples of silver glass include those available from Ishizuka Glass Co., Ltd. of Japan such as IonPure® WPA (silver magnesium aluminum phosphate compound; contains 1.6% silver), IonPure® ZAF (silver magnesium aluminum phosphate borate compound; contains 0.42% silver), and IonPure® IPL (silver magnesium aluminum calcium phosphate borate compound; contains 1.8% silver). Silver glass compounds of this type are further described in U.S. Pat. Nos. 6,593,260 to Nomura and 6,939,820 to Numaguchi et al. (both assigned to Ishizuka). Other silver glass compounds include those available from KOA Glass Co. such as PG-601S[⅓$Ag_2O(P_2O_5CaO)_m3(B_2O_3)_n$] and PG 701F2[⅓$Ag_2O(ZnOP_2O_5)_m3(CaO2B_2O_3)_n$]. Silver glass compounds of this type are further described, for example, in U.S. Pat. No. 6,831,028 to Ishii (assigned to KOA).

These silver-containing antimicrobial agents, such as metallic silver, nanosilver, etc., may be utilized either in addition to, or as a substitute for, the preferred species listed above. Other silver ion-containing materials may also be used. Various combinations of these silver-containing materials may be made depending upon the desired properties to be achieved in the end-use product.

Generally, the inorganic silver-containing antimicrobial agent is present in the rubber formulation in an amount from about 0.01% to about 60% by total weight of the rubber formulation; more preferably, from about 0.05% to about 40%; and most preferably, from about 0.1% to about 30%.

The organic antimicrobial agent includes such compounds as triclosan; tributyl tin; quaternary ammonium salt; isothiazolinones; metal-containing compounds (such as zinc pyrithione); pyrithione-based compounds (such as sodium pyrithione); azoles (such as imidazoles and triazoles); diiodomethyl toluosulfone; and mixtures thereof.

Generally, the organic antimicrobial agent is present in the rubber formulation in an amount from about 0.001% to about 20% by total weight of the rubber formulation; more preferably, from about 0.01% to about 2%; and most preferably, from about 0.10% to about 1%.

Curing Agents

Of great importance to the effectiveness of the inventive articles in terms of antimicrobial and antifungal activity is the omission of deleterious amounts of sulfur-based curing agents, accelerators, and additives which bind silver from the rubber article. As noted above, it is believed, without intending to be bound to any specific scientific theory, that sulfur reacts with the silver-based antimicrobials and irreversibly binds the silver ions (as silver sulfides, for example) within the rubber composition and/or article itself. As such, the resultant silver sulfides, etc., are ineffective as antimicrobial agents and their presence renders the final product antimicrobially inactive. Thus, it has been necessary to produce a vulcanized rubber article lacking any appreciable amount of sulfur curing agents, accelerators, and additives therein. It should be appreciated that the term "appreciable amount" permits a small amount to be present. It has been found that, as a molar ratio, a 1:1 ratio (and above) between sulfur molar presence and silver molar presence results in a clear loss of antimicrobial activity within the desired ultimate vulcanized article. However, greater molar amounts of silver in relation to sulfur provide at least some antimicrobial properties to the desired article. A molar ratio range of from about 0.25:1 to about 0.000000001:1 of sulfur to silver ions is thus at least acceptable. The primary curing agent, however, should be of non-sulfur nature (such as a bisphenol or peroxide-based compound) in order to provide the desired antimicrobial activity for the subject rubber.

Although bisphenol and peroxide curing agents have been utilized for vulcanization of rubber previously, such different types of curing agents are not widely utilized as suitable vulcanization catalysts for rubber for a number of reasons. Foremost, such curing agents are much more costly than standard sulfur-based agents and the utilization of such bisphenols and/or peroxides, and the like, as a replacement for the sulfur-based compounds have been rather limited to mostly silicone-based rubbers or, at the very least, non-antibacterial rubber articles. However, due to the problems associated with antimicrobial activity when such compounds are reacted with sulfur-based curing agents, alternatives to such sulfur-based cured articles was to permit utilization of such effective antimicrobial compounds within raw and vulcanized rubber for long-term high log kill rate effects. Thus, although non-sulfur-based compounds are not readily utilized within the non-silicone industry as vulcanization curing agents, utilization of such curing agents was necessary to provide an effective, ultimate antimicrobial vulcanized rubber article.

Surprisingly, it has now been found that the inventive antimicrobial rubber articles listed above are available without such sulfur-based curing agents in any appreciable amounts; most importantly, with the introduction of certain additives, the structural integrity and/or flexural modulus of the rubber article is improved to an acceptable level, and the efficacy of the antimicrobial components can be controlled simultaneously.

Thus, the curing agent present within the raw rubber formulation to be vulcanized to form the inventive molded rubber article must be at least a majority, and preferably at least about 75% by weight of a non-sulfur-based curing agent. As discussed above, traditional sulfur and sulfur-based catalysts will not work with the inventive antimicrobial formulations due to chemical reactions between the sulfur atoms and the antimicrobial silver ion. However, non-sulfur-based catalysts provide effective curing for the inventive raw rubber formulations, such as, for example and without limitation, bisphenols, peroxides, and resin curing systems. Peroxides include, for example, organic peroxides such as dicumyl peroxide, 2,5-bis(t-butylperoxy)-2,5-dimethylhexane, di-(t-butyl-peroxy-isopropyl)benzene, di-(t-butyl-peroxy-trimethyl)-cyclohexane, and the like, as well as inorganic peroxides.

Other Agents and Additives

It may be desirable to include additional additives to the antimicrobial rubber formulation which aid in the processing and manufacturing of the formulations and/or articles made therefrom. For example, certain fillers and oils may be added to the antimicrobial rubber formulations in order to provide both flexural modulus and structural integrity to vulcanized rubber articles. Fillers may include silica, pigments (e.g. carbon black), magnesium oxide, calcium hydroxide, calcium carbonate, stearates, clays, calcium meta-silicates, and mixtures thereof. Oils may include phthalate oil, paraffinic oil, naphthanic oil, and mixtures thereof. The rubber component alone generally does not exhibit proper dimensional stability without such additives.

Other non-limiting examples of additives which may be added to the antimicrobial rubber formulation of the present invention include the use of chemical plasticizers, which aid in the breakdown period of the rubber elastomer during compounding and processing (and provides flexural modulus properties to the finished article). Additionally, in order to form a blown (foam or sponge) rubber article, a blowing agent may be added to the inventive formulation.

Other additives present within the inventive antimicrobial rubber formulation may include accelerators, accelerator activators, antidegradants, softeners, abrasives, colorants, flame retardants, homogenizing agents, internal lubricants, mold-releasing additives, perfumes and odorants. Such components should be present, if at all, in rather low amounts, of from about 0.1 to about 50 parts per hundred parts rubber ("pphr").

EXAMPLES

The following examples further illustrate the molded rubber article of the present invention, but are not to be construed as limiting the invention as defined in the claims appended hereto. All parts and percents given in these examples are by weight unless otherwise indicated.

A. Inventive Antimicrobial Rubber Formulation

Example 1

| Component | Amount (pphr) |
|---|---|
| Keltan ® 708 x15 (EPDM rubber) | 80.50 |
| Royalene ® 697 (EPDM rubber) | 60.00 |
| Struktol ® WS 180 (organosilicone) | 3.00 |
| Zinc oxide active | 5.00 |
| PAT ® RU55/P (organic acid derivative) | 4.00 |
| Alcanpoudre ® 172-70 (vinyl tris(2-methoxyethoxy)silane) | 1.50 |
| Titanium dioxide | 10.00 |
| FEF N550 (carbon black) | 0.20 |
| Mistron Vapour ® (magnesium silicate) | 20.00 |
| Perkasil ® 408 (silicon dioxide) | 30.00 |
| Caloxal ® CP2 (calcium oxide) | 10.00 |
| Perkadox ® 14/40 [di-(tert-butyl-peroxy-isopropyl)benzene] | 6.00 |
| Alcanpoudre ® A70H (polybutadiene resin) | 20.00 |
| Strukthene ® 380 (naphthenic oil) | 20.00 |
| AlphaSan ® RC2000 (silver antimicrobial) | 5.20 |
| IonPure ® WPA (silver glass) | 2.60 |
| Zinc Pyrithione | 2.02 |
| Total Parts: | 280.02 |

The inorganic silver antimicrobial utilized in Example 1 was AlphaSan® RC2000 (available from Milliken & Company), a silver ion-exchange zirconium phosphate salt, exhibiting 10% Ag+ concentration and including $Ag_xNa_yH_zZr_2(PO_4)_3$, where $x+y+z=1$, as other components (% by weight). The inorganic silver glass utilized in Example 1 was Ion-Pure® WPA (available from Ishizuka Glass Co.), a silver magnesium aluminum phosphate compound which contains 1.6% silver.

The rubber formulation for Example 1 was subsequently processed and formed into a washing machine bellow. The mold temperature was 200 degrees C. The cure time was 3 minutes. The screw temperature was 70 degrees C., and the barrel temperature was 80 degrees C. The injection pressure was 85 mPa, and the injection speed was 210 mm/s.

Example 2

The rubber formulation of Example 1 was also processed and formed into a molded rubber sheet. The mold temperature was 190 degrees C. The cure time was 5 minutes. This sample was used to determine the physical integrity of the rubber formulation and was thus subjected to strength and rheology testing.

B. Comparative Examples and Control

Several commercially available washing machine bellows were also purchased for evaluation and are notated as Comparative Examples 1 through 4 below. Comparative Examples 5-7 were prepared to evaluate the antimicrobial and antifungal efficacy of various rubber formulations. A Sample Control was also prepared and tested which contained no antimicrobial or antifungal agents.

Comparative Example 1

Commercially available antimicrobial washing machine bellow (containing 10,10'-oxybisphenox-arsine as an antimicrobial agent; "OBPA")

Comparative Example 2

Commercially available washing machine bellow (containing no antimicrobial agent)

Comparative Example 3

Commercially available antimicrobial washing machine bellow (containing 2-mercaptobenzothiazole)

Comparative Example 4

Commercially available antimicrobial washing machine bellow (containing a non-silver based antimicrobial agent)

Comparative Example 5

A washing machine bellow made according to Example 1, except that the formula does not contain silver glass or zinc pyrithione (i.e. only contains AlphaSan® as antimicrobial agent)

Comparative Example 6

A washing machine bellow made according to Example 1, except that the formula does not contain AlphaSan® or silver glass (i.e. only contains zinc pyrithione as antimicrobial agent)

Comparative Example 7

A washing machine bellow made according to Example 1, except that the formula does not contain AlphaSan® or zinc pyrithione (i.e. only contains silver glass as antimicrobial agent)

A sample Control 1 was prepared according to the following formulation:

Control 1

| Component | Amount (pphr) |
|---|---|
| Dutral ® 6537 (EPDM rubber) | 80.00 |
| Dutral ® 4033 (EPDM rubber) | 60.00 |
| Struktol ® WS 180 (organosilicone) | 3.00 |
| Zinc oxide active | 5.00 |
| PAT ® RU55/P (organic acid derivative) | 4.00 |
| Alcanpoudre ® 172-70 (vinyl tris(2-methoxyethoxy)silane) | 1.50 |
| Titanium dioxide | 10.00 |
| FEF N550 (carbon black) | 0.20 |
| Mistron Vapour ® (magnesium silicate) | 20.00 |
| Perkasil ® 408 (silicon dioxide) | 30.00 |
| Caloxal ® CP2 (calcium oxide) | 10.00 |
| Perkadox ® 14/40 [di-(tert-butyl-peroxy-isopropyl)benzene] | 6.00 |
| Alcanpoudre ® A70H (polybutadiene resin) | 5.00 |
| HVA ® 2 (N,N'-m-phenylene-dimaleimide) | 0.50 |
| PROAID ® LCF (Methyl 12-hydroxystearate) | 5.00 |
| Strukthene ® 380 (naphthenic oil) | 20.00 |
| Total Parts: | 260.20 |

C. Test Methods

Each of the above Examples, Comparative Examples, and Sample Controls were tested for a variety of characteristics. The testing procedures are described in more detail below. However, a listing of the tests used is as follows:

| | |
|---|---|
| Test 1. | Antimicrobial Efficacy Against Bacteria |
| Test 2. | Antimicrobial Efficacy Against Fungi |
| Test 3 | Zone of Inhibition Test Against Bacteria and Fungi |
| Test 4 | Silver Elution Test |
| Test 5 | Durability Test |
| Test 6 | Strength and Rheology Test |

Test 1: Antimicrobial Efficacy Against Bacteria

Antimicrobial efficacy against *Staphylococcus aureus* ATCC #6538 and *Klebsiella pneumoniae* ATCC #4352 was measured for the Inventive Examples and the Comparative Examples. Two control samples were also tested—a laboratory control ("Lab Control") and a sample control, neither of which contained an antimicrobial, antibacterial, or antifungal agent ("Control 1").

Efficacy against the bacteria was assessed with a modified version of the JIS Z2801 Test Method, the "Plate Contact Method." Samples were not sterilized prior to testing. Samples were placed in sterile Petri dishes and exposed to bacteria (0.4 mL of 10E5 CFU/mL) suspended in 0.2% Japanese Nutrient Broth in 100 mM Na/K phosphate buffer for 22 hours at 37 degrees C. The Japanese Nutrient Broth consists of 10 g/L peptone, 3 g/L beef extract, and 5 g/L NaCl. The bacterial suspension was covered with a sanitized 3 mil polypropylene film to spread the suspension across the surface of the sample and to prevent desiccation. After incubation, the samples were washed to remove attached cells. The number of viable cells in the wash solution was quantified using a microtiter plate-based "most probable number" assay. The antimicrobial efficacy (log reduction) was measured by subtracting the log of the number of cells recovered from the test sample from the number of cells recovered from the control sample. A positive log reduction value indicates an antimicrobial effect, as less cells were recovered from the treated sample than from the control sample. A negative log reduction value indicates microbial growth on the sample as compared to the control sample.

Test results are provided in Tables 1A, 1B and 1C.

For this testing, *Staphylococcus aureus* ATCC#6538 and/or *Klebsiella pneumoniae* ATCC#4352 were selected as representative microbes. However, it should be understood to be within the scope of this invention that the antimicrobial rubber formulations of the present invention would exhibit similar antimicrobial efficacy against other Gram-positive and Gram-negative bacteria.

TABLE 1A

Log Kill Values For Inventive Antimicrobial Rubber Against *Staphylococcus aureus*

| Sample ID | Log Kill Value |
|---|---|
| Lab Control | 0.19 |
| Control 1 | 1.06 |
| Example 1 | 2.94 |

TABLE 1B

Log Kill Values For Inventive Antimicrobial Rubber Against *Klebsiella pneumoniae*

| Sample ID | Log Kill Value |
|---|---|
| Lab Control | −1.25 |
| Control 1 | −0.37 |
| Example 1 | 3.53 |

TABLE 1C

Log Kill Values For Comparative Examples Against *Klebsiella pneumoniae*

| Sample ID | Log Kill Value vs. Lab Control |
|---|---|
| Lab Control | −0.53 |
| Comparative Example 1 | 2.07 |
| Comparative Example 2 | −0.87 |
| Comparative Example 3 | 4.52 |
| Comparative Example 4 | 3.18 |
| Comparative Example 5 (AlphaSan ® antimicrobial) | 4.83 |
| Comparative Example 6 (zinc pyrithione) | 4.83 |
| Comparative Example 7 (silver glass) | 4.83 |

The test results provided in Tables 1A-1C indicate that Comparative Examples 1, 3 and 4, which contain antimicrobial agents, exhibit moderate to high antimicrobial efficacy against *Klebsiella pneumoniae*. Samples without an antimicrobial agent, such as the Lab Control and Comparative Example 2, fail to exhibit antimicrobial efficacy against either microbe and furthermore, foster microbial growth, as evidenced by the negative log reduction value.

Test 2: Antimicrobial Efficacy Against Fungi

Antimicrobial efficacy against *Aspergillus niger* ATCC #6275 was measured for the Inventive Examples and the Comparative Examples. Two control samples were also tested—a laboratory control ("Lab Control") and a sample control which contained no antimicrobial or antifungal agents ("Control 1").

Efficacy against fungi was assessed using a modified version of the ISO Method 846 against *Aspergillus niger* ATCC #6275. Briefly described, samples were placed on Mineral Salts Agar and inoculated with 10 droplets of 10 microliters each of 10E5 fungal spores/mL in a synthetic nutrient medium. This step was followed by incubation for 7-28 days at 30 degrees C. and >90% relative humidity.

Efficacy was measured by visual observation of the samples and a qualitative rating scale. Visual observations were rated using a series of three consecutive numbers. The first number indicates the number of droplets that had heavy growth due to the presence of many viable spores. The second number indicates the number of droplets that had light growth due to the presence of just a few viable spores. The third number indicates the number of droplets that remained clear due to the absence of viable spores. For example a rating of (3, 5, 2) indicates greater antimicrobial efficacy against fungi than (9, 1, 0). Test results are provided in Table 2.

TABLE 2

Efficacy of Inventive Antimicrobial Rubber Against *Aspergillus niger*

| Sample ID | Rating After 21 days |
|---|---|
| Control 1 | 10, 0, 0 |
| Example 1 | 0, 0, 10 |
| Comparative Example 1 | 0. 0, 10 |
| Comparative Example 2 | 1, 9, 0 |
| Comparative Example 3 | 0, 0, 10 |
| Comparative Example 4 | 0, 0, 10 |
| Comparative Example 5 (AlphaSan ® antimicrobial) | 10, 0, 0 |
| Comparative Example 6 (zinc pyrithione) | 0, 0, 10 |
| Comparative Example 7 (silver glass) | 10, 0, 0 |

The test results provided in Table 2 show that all of the samples containing an antimicrobial agent, Comparative Examples 1, 3 and 4, inhibit sporulation of *Aspergillus niger* under the test conditions. On the other hand, fungal growth is not hindered in the presence of rubber samples, Comparative Example 2, that did not contain antimicrobial agents. For this testing, *Aspergillus niger* was selected as the representative fungi. However, it should be understood to be within the scope of this invention that the antimicrobial formulations of the present invention would exhibit similar antifungal efficacy against other fungi such as *Penicillium* spp. or *C. albicans*, for example.

Test 3: Zone of Inhibition Test

Zone of Inhibition testing was conducted to determine the antimicrobial activity of the Inventive and Comparative Examples against *Klebsiella pneumoniae* ATCC #4362 using a modified version of AATCC Test Method 147. A brief description of the test method is included below.

For efficacy testing against *K. pneumoniae*:

An overnight culture of approximately 5E6 CFU/mL of the test microbe was diluted into 100 mM Na/K phosphate buffer. Petri dishes containing Tryptic Soy Agar were inoculated with 0.1 ml of the cell suspension and incubated for 1 hour. A sample (approximately 1 inch by 1 inch) of each antimicrobial rubber sample was then placed at the center of the agar plate. The agar plate was incubated for 24 hours at 37° C. The efficacy was measured as the size of the clear zone present around the sample (i.e. zone of inhibition or "ZOI"). The test results provided represent the average of the zone measured on each of the four sides of the sample.

The results of the zone of inhibition tests for each sample are shown in Table 3.

TABLE 3

Zone of Inhibition Values Against *Klebsiella pneumoniae*

| Sample ID | Zone of Inhibition (mm) | Growth Under Sample? |
|---|---|---|
| Control 1 | 0 | Yes |
| Example 1 | 5 | No |
| Comparative Example 1 | 0 | No |
| Comparative Example 2 | 0 | Yes |
| Comparative Example 3 | 0 | No |
| Comparative Example 4 | 0 | No |
| Comparative Example 5 (AlphaSan ® antimicrobial) | 0 | Yes |
| Comparative Example 6 (zinc pyrithione) | 5 | No |
| Comparative Example 7 (silver glass) | 0 | Yes |

The test results in Table 3 illustrate that although Comparative Examples 1, 3 and 4 contain an antimicrobial agent, these samples fail to produce a zone of inhibition against fungi or bacteria. Their antimicrobial activity is evidenced by the lack of growth under the sample. Samples without an antimicrobial agent, such as Comparative Example 2, fail to provide a zone of inhibition and furthermore, exhibit growth of microbes under the sample.

Test 4: Silver Elution Test

The Inventive and Comparative Examples were tested to determine their ability to controllably release surface available silver in a buffer solution.

A 10× strength stock extraction solution of 1 M Na/K phosphate buffer solution was prepared by combining (in a 1 L flask) 144.46 g of sodium phosphate with 71.18 g of potassium phosphate. Deionized water was then added to the 1 L flask until the flask contained a total volume of 1000 mL. The contents of the flask were mixed with a stir bar until all salts were completely dissolved. The 10× buffer stock extraction solution was then diluted to 1× by diluting 100 mL of the 10× buffer stock to 1000 mL of deionized water.

Two pieces of each sample (approximately 2 inches by 3 inches each) were immersed in a container holding 15 mL of the 1× buffer solution for 24 hours at 37 degrees C. under low agitation. The extraction solution was then analyzed by inductively coupled plasma to determine the amount of available silver removed from the rubber samples.

Test results are shown in Table 4.

TABLE 4

Silver Elution In Buffer Solution

| Sample ID | ICP Reading (µg/L) | Silver Amount (ppb/cm$^2$) | Silver Amount (ng/cm$^2$) |
|---|---|---|---|
| Control 1 | ND | ND | ND |
| Example 1 | 20.3 | 0.13 | 2.0511 |

TABLE 4-continued

Silver Elution In Buffer Solution

| Sample ID | ICP Reading (µg/L) | Silver Amount (ppb/cm$^2$) | Silver Amount (ng/cm$^2$) |
|---|---|---|---|
| Comparative Example 5 (AlphaSan ® antimicrobial) | 16.4 | 0.109 | 1.7275 |

"ND" indicates that an amount was not detectable.

Test 5: Durability Test

Wash durability testing was performed under accelerated conditions as specified by AATCC Test Method 61-2001. More specifically, a modification of condition 2A was run multiple times to simulate 100 washes. According to the modified condition 2A, samples were subjected to 120° F. (49° C.) for 45 minutes, without detergent or chlorine, and 50 steel balls were added in order to simulate 5 washes. Water was changed after 5 simulated washes. Specimens subjected to this test should show changes similar to those produced by 100 home machine launderings at medium or warm setting in the temperature range of 38+/−3 degrees C. (100+/−5 degrees F.), both without detergent or chlorine. Test results are shown in Table 5.

TABLE 5

Antimicrobial Efficacy After 100 Simulated Home Launderings

| Sample ID | ISO 846 Rating After 21 days | Log Kill Value vs. Lab Control Against *Klebsiella pneumoniae* |
|---|---|---|
| Example 1 | (0, 0, 10) No Growth | LR = 4.83 Very High Efficacy |
| Comparative Example 1 | (0, 0, 10) No Growth | LR = 4.12 High Efficacy |
| Comparative Example 2 | (10, 0, 0) Dark Growth | LR = −0.43 No Efficacy |
| Comparative Example 3 | (8, 1, 1) Dark Growth | LR = −0.20 No Efficacy |
| Comparative Example 4 | (0, 2, 8) Light Growth | LR = 1.79 Moderate Efficacy |

The test results in Table 5 illustrate the lack of wash durability on most Comparative Examples as compared to Inventive Example 1. More specifically, both antifungal and antibacterial activity was lost on all Comparative Examples, except for Comparative Example 1. Nonetheless, the antibacterial efficacy of Comparative Example 1 is 1 Log, or 90% lower, than that of Inventive Example 1 after the 100 wash simulation.

Test 6: Strength and Rheology Test

The purpose of this test is to determine the physical properties and rheology properties of the inventive molded rubber article. Strength testing was performed according to ASTM D412. Rheology testing was performed on a Monsanto R100S ODR machine.

Test results are provided in Tables 6A and 6B below.

TABLE 6A

Strength Testing Values For Inventive Example

| Sample ID | Tensile Strength (mPa) | Elongation at Break (%) | Modulus 100 (mPa) | Crescent Tear (N/mm) |
|---|---|---|---|---|
| Control 1 | 10.87 | 782 | 0.86 | 23.89 |
| Example 2 | 13.55 | 660 | 1.27 | 24.99 |

The test results illustrate that the addition of silver antimicrobial agents and organic antimicrobial agents has no deleterious affect on the strength properties of the molded rubber article.

TABLE 6B

Rheology Testing Values For Inventive Example

| Sample ID | Minimum (ML) (in/lb) | Maximum (MH) (in/lb) | TS2 (min:sec) | T90% (min:sec) |
|---|---|---|---|---|
| Control 1 | 6.78 | 30.27 | 1:05 | 5:16 |
| Example 2 | 12.31 | 50.20 | 1:13 | 5:10 |

The test results illustrate that the addition of silver antimicrobial agents and organic antimicrobial agents has no deleterious affect on the rheology properties of the molded rubber article.

These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the scope of the invention described in the appended claims.

We claim:

1. A molded rubber article comprising at least one rubber constituent, at least one silver-containing inorganic antimicrobial compound, at least one organic antimicrobial compound, and at least one curing agent, and wherein said molded rubber article exhibits antimicrobial properties.

2. The molded rubber article of claim 1, wherein said rubber constituent is selected from the group consisting of nitrile rubber, nitrile butadiene rubber, ethylene propylene diene monomer rubber, hydrogenated NBR, carboxylated NBR, and mixtures thereof.

3. The molded rubber article of claim 1 wherein said silver-containing inorganic antimicrobial compound is selected from the group consisting of silver ion exchange materials, silver particles, silver salts, silver glass, and mixtures thereof.

4. The molded rubber article of claim 3, wherein silver ion exchange materials are selected from the group consisting of silver zirconium phosphates, silver calcium phosphates, silver zeolites, and mixtures thereof.

5. The molded rubber article of claim 3, wherein silver particles are selected from the group consisting of silver metal, nanosilver, colloidal silver and mixtures thereof.

6. The molded rubber article of claim 3, wherein silver salts are selected from the group consisting of AgCl, $Ag_2CO_3$, and mixtures thereof.

7. The molded rubber article of claim 3, wherein silver glass is selected from the group consisting of silver magnesium aluminum phosphate compounds, silver magnesium aluminum phosphate borate compounds, silver magnesium aluminum calcium phosphate borate compounds, and mixtures thereof.

8. The molded rubber article of claim 1, wherein the organic antimicrobial compound is selected from the group consisting of triclosan, tributyl tin, quaternary ammonium salt, isothiazolinones, metal-containing compounds, pyrithione-based compounds, azoles, diiodomethyl toluosulfone, and mixtures thereof.

9. The molded rubber article of claim 8, wherein the organic antimicrobial compound contains zinc.

10. The molded rubber article of claim 9, wherein the organic antimicrobial compound is zinc pyrithione.

11. The molded rubber article of claim 1, wherein the curing agent is selected from the group consisting of peroxide-based curing agents, bisphenol-based curing agents, sulfur-based curing agents, and mixtures thereof.

12. The molded rubber article of claim 1, wherein the molded rubber article further comprises at least one additive selected from the group consisting of fillers, oils, pigments, salts, accelerators, flame retardants, chemical plasticizers, blowing agents, mold-releasing additives, perfumes, odorants, and any mixtures thereof.

13. The molded rubber article of claim 12 wherein the filler is selected from the group consisting of silica, pigments, magnesium oxide, calcium hydroxide, calcium carbonate, stearates, clays, and mixtures thereof.

14. The molded rubber article of claim 12, wherein oils are selected from the group consisting of paraffinic oil, phthalate oil, and mixtures thereof.

15. The molded rubber article of claim 1, wherein the article exhibits log kill rates against *Staphylococcus aureus* ATCC #6538 and *Klebsiella pneumoniae* ATCC #4352 of at least 1.0 each after 24 hours exposure at room temperature.

16. The molded rubber article of claim 1, wherein the article is a washing machine bellow.

17. A rubber composition comprising at least one ethylene propylene diene monomer rubber component, at least one peroxide curing agent, at least one silver-containing inorganic antimicrobial agent, and at least one zinc-containing organic antimicrobial agent.

18. A dimensionally stable vulcanized rubber article comprising at least a majority of a rubber constituent selected from the group consisting of ethylene propylene diene monomer rubber, nitrite butadiene rubber, and any mixtures thereof; at least one silver-containing inorganic antimicrobial compound; and at least one zinc-containing organic antimicrobial compound; and wherein said rubber article exhibits log kill rates against *Staphylococcus aureus* ATCC #6538 and *Klebsiella pneumoniae* ATCC #4352 of at least 1.0 each after 24 hours exposure at room temperature.

* * * * *